United States Patent
Wang et al.

(10) Patent No.: US 9,936,258 B2
(45) Date of Patent: Apr. 3, 2018

(54) PRESENTING VIDEO CONTENT TO ONLINE SYSTEM USERS IN RESPONSE TO USER INTERACTIONS WITH VIDEO CONTENT PRESENTED IN A FEED OF CONTENT ITEMS

(71) Applicant: Facebook, Inc., Menlo Park, CA (US)

(72) Inventors: Yuanxuan Wang, San Carlos, CA (US); Brett Welch, San Francisco, CA (US); Sahil P. Thaker, San Jose, CA (US); Fidji Nahema Simo, Palo Alto, CA (US); Deepa Diwakar, Mountain View, CA (US); Varun Kacholia, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/703,652

(22) Filed: May 4, 2015

(65) Prior Publication Data

US 2016/0330524 A1    Nov. 10, 2016

(51) Int. Cl.
| | |
|---|---|
| *G06F 3/00* | (2006.01) |
| *G06F 13/00* | (2006.01) |
| *H04N 5/445* | (2011.01) |
| *H04N 21/482* | (2011.01) |
| *H04N 21/25* | (2011.01) |
| *H04N 21/472* | (2011.01) |

(52) U.S. Cl.
CPC ....... *H04N 21/4826* (2013.01); *H04N 21/251* (2013.01); *H04N 21/47205* (2013.01)

(58) Field of Classification Search
CPC ........... H04N 21/4826; H04N 21/2668; H04N 21/431; H04N 21/4782; H04N 21/25883; H04N 21/251; H04N 21/4316; H04N 21/26208; H04N 21/4396; H04N 21/44222; H04N 21/25891
USPC .................................. 725/14, 37, 38, 46
See application file for complete search history.

(56) References Cited

U.S. PATENT DOCUMENTS

| | | | | |
|---|---|---|---|---|
| 8,910,076 | B2 * | 12/2014 | Fernandez | G06T 11/60 715/792 |
| 2007/0139443 | A1 * | 6/2007 | Marks | G06F 3/017 345/629 |
| 2012/0278764 | A1 * | 11/2012 | Arriola | G06F 17/30058 715/835 |

(Continued)

*Primary Examiner* — Nnenna Ekpo
(74) *Attorney, Agent, or Firm* — Fenwick & West LLP

(57) ABSTRACT

An online system generates a feed of content items for a user subject to a limitation restricting the number of content items including video data ("video content items") included in the feed. If the user interacts with a video content item the feed, the online system selects candidate video content items based on characteristics of the video content item in the feed and characteristics of the user. The online system determines likelihoods of the user interacting with various candidate video content items and selects candidate video content items based on the determined likelihoods. To present the user with additional video content items, the online system generates an interface including the selected candidate video content items and presents the interface to the user. The interface may be presented in place of the feed or may be presented as within the feed and presents different video content items based on user interactions.

16 Claims, 5 Drawing Sheets

(56) References Cited

U.S. PATENT DOCUMENTS

| | | | |
|---|---|---|---|
| 2013/0204825 A1* | 8/2013 | Su | G06N 5/04 706/46 |
| 2015/0169744 A1* | 6/2015 | Walkingshaw | G06Q 30/0251 707/738 |
| 2015/0312603 A1* | 10/2015 | Singh | H04N 21/251 725/93 |

* cited by examiner

PRESENTING VIDEO CONTENT TO ONLINE SYSTEM USERS IN RESPONSE TO USER INTERACTIONS WITH VIDEO CONTENT PRESENTED IN A FEED OF CONTENT ITEMS

BACKGROUND

This disclosure relates generally to online systems, and more specifically to presenting video content to users of an online system.

An online system allows users to connect to and to communicate with other users of the online system. Users create profiles on an online system that are tied to their identities and include information about the users, such as interests and demographic information. The users may be individuals or entities such as corporations or charities. An online system receives content from various sources, such as users and advertisers, and selects content items from the received content for presentation to its users. The online system presents content items to various users by the online system to encourage user interaction with the online system.

Many online systems present content items to their users via a feed of content items (e.g., a newsfeed). For example, an online system presents a newsfeed to a user that includes advertisements, stories describing actions performed by additional users of the online system connected to the user, and content provided to videos posted by additional users of the online system connected to the user. To diversify content presented to the user via a feed of content, an online system may enforce limitations on types of content presented in a feed of content item. For example, an online system limits a total number of video content items included in a feed of content items or limits a number of video content items having certain characteristics included in a feed of content items.

If a user of an online system interacts with a video content item presented in a feed, an online system may infer the user has an interest in additional video content items, such as video content items having similar characteristics to the video content item with which the user interacted. While the online system may identify additional content items having matching or similar characteristics to the video content item with which the user interacted, enforcing limitations on the number of video content items included in the feed may prevent a conventional online system from including the identified additional content items in the feed. Omitting the additional video content items from the feed may reduce user interaction with the feed, which may impair subsequent selection of content for presentation to the user by the online system.

SUMMARY

An online system generates a feed of content items for presentation to a user, such as a newsfeed including content items. The feed may include various types of content items, such as content items including video data ("video content items") and content items including text or image data. In some embodiments, the online system limits a number of video content items included in the feed. For example, the online system includes less than a threshold number of video content items in the feed or includes less than a threshold number of video content items having specific characteristics in the feed. As a specific example, the online system includes no more than five video content items provided by users in a feed and includes no more than three video content items that are advertisements in the feed.

To allow a user presented with the feed to view additional video content items while enforcing one or more limitations on the number of video content items included in the feed, the online system, when a user presented with the feed interacts with a video content item in the feed, the online system generates an interface including additional video content items and presents the interface to the user. The interface including the additional video content items may be generated in response to the user performing certain types of interactions with a video content item presented in the feed. Example interactions with a video content item causing the online system to generate the interface include: requesting to view the video data in the video content item, unmuting the video in the video data in the video content item, playing the video data in the video content item in a full-screen mode, and viewing at least a threshold percentage of the video data.

When generating the interface, the online system identifies candidate video content items having that have at least a threshold number of characteristics matching characteristics of a video content item with which the user interacted or having at least a threshold number of characteristics matching characteristics of the user. For example, the online system identifies video content items provided to the online system by a user who provided the video content item with which the user interacted as candidate video content items. As another example, the online system identifies candidate video content items as video content items including text data (e.g., keywords, hashtags) matching (or associated with) text data included in the video content item with which the user interacted.

In various embodiments, one or more candidate video content items having characteristics matching at least a threshold number of characteristics associated with the user are identified. As an example, video content items associated with a geographic location (or other demographic information) matching a geographic location (or other demographic information) associated with the user are identified as candidate video content items. For example, candidate video content items are identified as video content items that are associated with an interaction or action that is also associated with the user (e.g., video content items associated with a prior search performed by the user via the online system). As another example, video content items having at least a threshold measure of similarity to video content items with which the user previously interacted are identified as candidate content items (e.g., video content items having at least a threshold number of characteristics matching characteristics of the video content item with which the user interacted). Candidate video content items may also be identified as video content items associated with the video content item with which the viewing user interacted (e.g., additional video content items posted in comments to the video content item, additional video content items manually linked to the video content item, additional video content items associated with one or more actions performed by the user on a third party system and communicated to the online system, etc.). Characteristics of the user may include measures of similarity between the user and additional users of the online system. For example, the online system generates a measure of similarity between a user and an additional user based on matching or similar characteristics of the user and the additional user, content with which the user and the additional user interacted, or other suitable information. Video content items with which additional users having at least a threshold measure of similarity to the user interacted are identified as candidate video content items in some embodiments. For example, additional video content items with which additional users having at least a threshold measure of similarity to the user and who performed a specific action (e.g., posted the additional video content item to the online system, shared the additional video content item with another user, viewed video data in the additional video content item, commented on the additional video content item etc.) are identified as candidate video content items.

The online system determines likelihoods of the user interacting with various candidate video content items based on characteristics of the user, characteristics of content with which the user previously interacted, and characteristics of the candidate video content items. For example, the online system determines a likelihood of the user interacting with each candidate video content item. The online system may determine the likelihood of the user interacting with a candidate video content item based on the user's prior interactions with content items having at least a threshold number of characteristics matching or similar to characteristics of the candidate video content item, interactions by additional users connected to the user with the candidate video content item, based on interactions by additional users having at least a threshold measure of similarity to the user with the candidate video content item, or based on any other suitable information. In some embodiments, the online system trains a machine-learned model to determine likelihoods of user interacting with candidate video content items (e.g., based on historical interactions of users connected to the viewing user with the video content items, based on prior interactions by the user, based on demographic information associated with the user, etc.). Characteristics of the candidate content item may also be used when determining the likelihoods of the user interacting with various candidate content items.

Based at least in part on the likelihoods of the user interacting with candidate video content items, the online system selects one or more candidate video content items. For example, the online system ranks the candidate video content items based on the likelihoods of the user interacting with the candidate video content items and selects candidate video content items having at least a threshold position in the ranking. The online system generates an interface including the selected candidate video content items, such as an interface including one or more of the selected candidate video content items. In some embodiments, the generated interface includes information describing one or more reasons for including the selected candidate video content items in the interface. For example, if the user views a video content item, the interface presented to the user includes a caption indicating that additional users that viewed the video content item also viewed the selected candidate video content items included in the interface.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
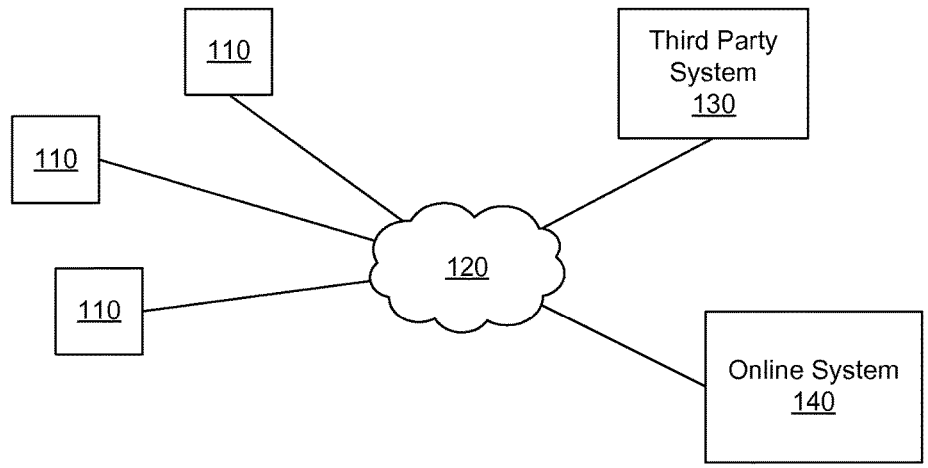
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
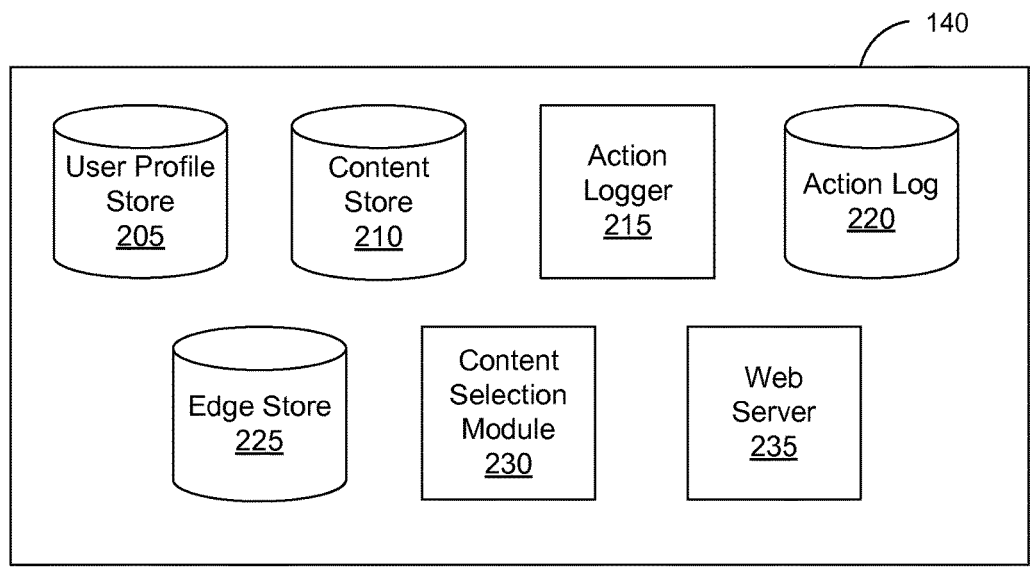
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content, so an object represents a content item. Examples of content represented by an object include a page post, a status update, a photograph, a video, a link, a shared content item, a gaming application achievement, a check-in event at a local business, a page (e.g., brand page), or any other type of content. Some content items included in the content store 210 include video data that is presented to an online system user. A content item including video data is referred to herein as a "video content item." Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. As an example of a communication about user action external to the online system 140, the action logger 215 receives information describing content items provided by a third party system 130 accessed by an online system user or other information describing interactions by the online system user with content provided by the third party system 130 and information identifying the online system user and stores the information describing the online system user's interactions with content provided by the third party system in the action log 220 in association with the online system user. For example, a third party system 130 includes a tracking mechanism, such as a tracking pixel, in content provided by the third party system 130, so a client device 110 presenting the content from the third party system 130 executes instructions in the tracking mechanism when one or more specified interactions with the content provided by the third party system 130 are received via the client device 110 (e.g., an interaction with the content provided by the third party system 130 matching an interaction specified in the tracking mechanism. For example, the action logger 215 logs information describing a number of times a user of the online system 140 accessed a web page provided by a third party system 130 as well as a number of times the user accessed video content presented via the web page provided by the third party system 130 based on information received from a tracking mechanism included in the web page. In addition, a number of actions may involve an object and one or more particular users, so these actions are associated with the particular users as well and stored in the action log 220.

Additionally, the action logger 215 logs information describing interactions between online system users and video content items presented to the online system users to the action log 220. For example, the action logger 215 obtains information describing a number of times a user of the online system 140 played video data in a video content item or commented on a video content item and logs the information in the action log 220 along with information identifying the user. Times associated with the interactions between the user and the video content item may also be stored in the action log 220 association with information identifying the user and identifying the video content item.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items (including video content items), and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Similarly, a third party system 130 may include a tracking mechanism, such as a tracking pixel, in content provided by the third party system 130. The tracking mechanism includes instructions identifying one or more interactions with the content item and instructions that, when executed by a client device 110, communicate information identifying the one or more interactions to the online system 140. In some embodiments, the tracking mechanism also communicates information identifying a user who performed the one or more interactions; alternatively, the online system 140 retrieves information identifying the user who performed the one or more interactions after receiving information describing the one or more interactions and stores information identifying the one or more interactions, the content provided by the third party system 130, and the user who performed the one or more interactions. Hence, the action log 220 may record information about actions users perform on a third party system 130, including webpage viewing histories, interactions with advertisements, purchases made, and other patterns from shopping and buying. Additionally, actions a user performs via an application associated with a third party system 130 and executing on a client device 110 may be communicated to the action logger 215 for storing in the action log 220 by the application for recordation and association with the user by the online system 140.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, interest in a topic, or interest in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the viewing user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 230 uses the bid amounts associated with ad requests when selecting content for presentation to the viewing user. In various embodiments, the content selection module 230 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of the user interacting with the ad content from the ad request. The content selection module 230 may rank ad requests based on their associated bid amounts and select ad requests having at least a threshold position in the ranking for presentation to the user. In some embodiments, the content selection module 230 ranks both content items not associated with bid amounts and ad requests in a unified ranking based on bid amounts associated with ad requests and measures of relevance associated with content items and ad requests. Based on the unified ranking, the content selection module 230 selects content for presentation to the user. Selecting ad requests and other content items through a unified ranking is further described in U.S. patent application Ser. No. 13/545, 266, filed on Jul. 10, 2012, which is hereby incorporated by reference in its entirety.

For example, the content selection module 230 receives a request to present a feed of content to a user of the online system 140. The feed may include one or more advertisements as well as content items, such as stories describing actions associated with other online system users connected to the user. The content selection module 230 accesses one or more of the user profile store 205, the content store 210, the action log 220, and the edge store 225 to retrieve information about the user. For example, stories or other data associated with users connected to the identified user are retrieved. Additionally, one or more advertisement requests ("ad requests") may be retrieved from the content store 210. An ad request includes content for presentation to a user as well as a bid amount indicating a maximum amount of compensation provided to the online system 140 by an entity associated with the ad request for presenting the ad request to users or for receiving an interaction with the ad request. The retrieved stories, ad requests, or other content items, are analyzed by the content selection module 230 to identify candidate content that is likely to be relevant to the identified user. For example, stories associated with users not connected to the identified user or stories associated with users for which the identified user has less than a threshold affinity are discarded as candidate content. Based on various criteria, the content selection module 230 selects one or more of the content items or ad requests identified as candidate content for presentation to the identified user. The selected content items or ad requests are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. One or more advertisements may also be included in the feed. The content selection module 230 may also determine the order in which selected content items or advertisements are presented via the feed. For example, the content selection module 230 orders content items or advertisements in the feed based on likelihoods of the user interacting with various content items or advertisements. When generating a feed, the content selection module 230 enforces one or more limitations on content included in the feed in some embodiments. For example, the content selection module 230 limits a number of video content items or a number of video content items having specific characteristics included in a feed. As a specific example, the content selection module 230 includes less than a threshold number of video content items associated with advertisers in a feed.

If the content selection module 230 enforces one or more limitations on a number or an amount of video content items included in a feed, the content selection module 230 may generate an additional interface including video content items for presentation to a user who interacts with a video content item presented in the feed. Generating the additional interface allows the content selection module to provide additional video content items to a user, which may increase the amount of interaction between the user and content provided by the content selection module 230 while enforcing limitations on inclusion of video content items in the feed. To generate the additional interface, when the content selection module 230 receives information indicating a user interacted with a video content item included in the feed, the content selection module 230 identifies candidate video content items from the content store 210 based on characteristics of the user and characteristics of the video content item with which the user interacted. Candidate video content items have at least a threshold number of characteristics matching characteristics of the user or characteristics of the video content item with which the user interacted. For example, candidate video content items are identified as video content items associated with an additional user who provided the video content item with which the user interacted to the online system 140, video content items associated with the video content item with which the user interacted, video content items associated with one or more interactions associated with the user, video content items associated with a location matching a location associated with the user, or video content items having other suitable characteristics matching characteristics of the user or of the video content item with which the user interacted. Selection of candidate video content item is further described below in conjunction with FIG. 3.

The content selection module 230 determines likelihoods of the user interacting with various candidate content items. In some embodiments, the content selection module 230 determines a likelihood of the user interacting with each candidate content item. Alternatively, the content selection module determines a likelihood of the user interacting with each candidate content item in a subset of the candidate content item. Various information may be used to determine the likelihood of the user interacting with a candidate content item. Characteristics of a candidate video content item, characteristics of the user, characteristics of content items with which the user previously interacted, and prior interactions by the user (e.g., prior interactions by the user with video content items having at least a threshold number of characteristics matching or similar to characteristics of the candidate video content item) may be used by a model that the content selection module 230 applies to the candidate video content item to determine the likelihood of the user interacting with the candidate video content item. The likelihood that a viewing user will interact with a candidate video content item may also be based on one or more sources from which it was obtained. For example, the scoring module 235 identifies sources that are most reliable at predicting the likelihood that viewing users will interact with candidate video content items and associates higher weights with these sources. In some embodiments, the content selection module 230 associates different weights with various characteristics of a candidate video content item when determining a likelihood of the user interacting with the candidate video content item; for example, higher weights are associated with characteristics of the candidate video content item matching characteristics of the video content item with which the user interacted.

Based at least in part on the likelihoods of the user interacting with various candidate content items, the content selection module 230 selects one or more candidate content items and generates an interface including the selected candidate content items. For example, the content selection module 230 ranks the candidate content items based on their associated likelihoods of user interaction and selects candidate content items having at least a threshold likelihood being interacted with by the user. Alternatively, the content selection module 230 selects candidate content items having at least a threshold likelihood of being interacted with by the user. In some embodiments, the content selection module selects candidate video content items and other types of content items for inclusion in the interface based on the likelihoods of the user interacting with various candidate video content items and likelihoods of the user interacting with other types of content items. The generated interface is communicated for a client device 110 associated with the user for presentation, allowing the user to view and interact with the selected candidate video content items. In some embodiments, the generated interface is a content presentation unit presented in a feed generated by the content selection module 230, and as the user interacts with the content presentation unit, a different selected candidate content item is presented by the content presentation unit. Alternatively, the generated interface is a different feed including the selected candidate video content items that is presented to the user. Examples of interfaces including selected candidate video content items are further described below in conjunction with FIGS. 4A-4B.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that is stored in the content store 210. Additionally, the web server 235 may provide application programming interface (API) functionality to send data directly to native client device operating systems, such as IOS®, ANDROID™, WEBOS®, or BlackberryOS.

Figure 3:
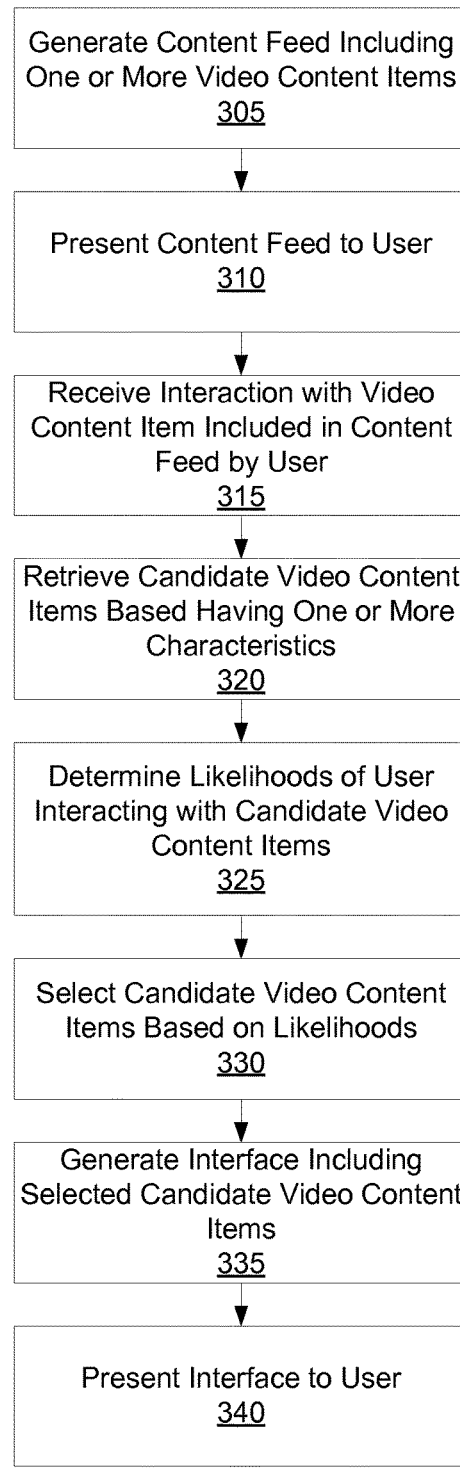
FIG. 3 is a flowchart of a method for presenting additional video content items to an online system user responsive to receiving an interaction by the user with a video content item presented in a content feed, in accordance with an embodiment.

Presenting Video Content Items Responsive to User Interactions with a Video Content Item FIG. 3 is a flowchart of one embodiment of a method for presenting additional video content items to an online system user responsive to receiving an interaction by the user with a video content item presented by the online system 140. In other embodiments, the method may include different and/or additional steps than those shown in FIG. 3. Additionally, steps of the method may be performed in different orders than the order described in conjunction with FIG. 3 in various embodiments.

The online system 140 generates 305 a feed of content items for presentation to a user that includes one or more content items including video data ("video content items"). For example, the online system 140 generates 305 the feed in response to receiving a request from the user for content. For example, the online system 140 generates 305 the feed after receiving a request to a request to refresh a feed of content for the user or after receiving a request for a feed of content item from the user. When generating 305 the feed, the online system 140 enforces one or more limitations on inclusion of video content items in the feed. For example, the online system includes no more than a threshold number of video content items in the feed or includes no more than a threshold number of video content items having one or more specific characteristics in the feed. The online system 140 presents 310 the generated feed to the user. For example, the online system 140 communicates the generated feed to a client device 110 associated with the user for presentation 310.

When the user interacts with a video content item included in the feed, the online system 140 receives 315 information describing the interaction with the video content item. Example interactions with the video content item include: requesting to play video data included in the video content item (e.g., accessing an interface element or a display area of the video data), unmuting the video data in the video content item (e.g., if the video data automatically plays, an interaction increasing volume of the video data), increasing the volume of the video data in the video content item to greater than a threshold level, requesting presentation of the video data in the video content item in a larger display area (e.g., presenting the video data in a display area occupying at least a threshold amount of a display area of a client device 110), and presenting at least a threshold percentage of the video data in the video content item (e.g., presenting at least 51% of the video data in the video content item). Information received 315 by the online system describing the interaction with the video content item identifies the video content item and may also identify the type of interaction with the video content item.

Responsive to receiving 310 the information describing the interaction by the user with the video content item included in the feed, the online system 140 retrieves 320 candidate content items based on characteristics of the user or characteristics of the video content item with which the user interacted. The online system 140 retrieves 320 candidate video content items having that have at least a threshold number of characteristics matching characteristics of the video content item with which the user interacted or having at least a threshold number of characteristics matching characteristics of the user. For example, the online system 140 retrieves 320 video content items provided to the online system 140 by a user who provided the video content item with which the user interacted as candidate video content items. As another example, the online system 140 retrieves 320 candidate video content items that are video content items including text data (e.g., keywords, hashtags) matching (or associated with) text data included in the video content item with which the user interacted. Additionally, video content items associated with the video content item with which the viewing user interacted (e.g., additional video content items posted in comments to the video content item, additional video content items manually linked to the video content item, additional video content items associated with one or more actions performed by the user on a third party system and communicated to the online system, etc.) may be retrieved 320 as candidate video content items. In another example, video content items having at least a threshold measure of similarity to video content items with which the user previously interacted are retrieved 320 as candidate content items (e.g., video content items having at least a threshold number of characteristics matching characteristics of a video content item with which the user previously performed a specific interaction).

In various embodiments, the online system 140 retrieves 320 one or more candidate video content items having characteristics matching at least a threshold number of characteristics associated with the user. For example, video content items associated with a geographic location (or other demographic information, such as an interest) matching a geographic location (or other demographic information, such as an interest) associated with the user are retrieved 320 as candidate video content items. As another example, video content items that are associated with an interaction or action that is also associated with the user (e.g., video content items associated with a prior search performed by the user via the online system) are retrieved 320 as candidate video content items. Characteristics of the user may include measures of similarity between the user and additional users of the online system 140. For example, the online system 140 generates a measure of similarity between a user and an additional user based on matching or similar characteristics of the user and the additional user, content with which the user and the additional user interacted, or other suitable information. Video content items with which additional users having at least a threshold measure of similarity to the user interacted are retrieved 320 as candidate video content items in some embodiments. For example, additional video content items with which additional users having at least a threshold measure of similarity to the user and who performed a specific action (e.g., posted the additional video content item to the online system, shared the additional video content item with another user, viewed video data in the additional video content item, commented on the additional video content item etc.) are retrieved 320 as candidate video content items.

The online system 140 determines 325 likelihoods of the user interacting with various candidate video content items based on characteristics of the user, characteristics of the candidate video content items, prior interactions by the user, or any other suitable information. For example, the online system 140 determines 325 a likelihood of the user interacting with a candidate video content item based on prior interactions by the user with video content items having at least a threshold number of characteristics or having at least a threshold measure of similarity to the candidate video content item. In some embodiments, the online system 140 applies a model to a video content item that associates weights with various characteristics of the video content item to determine 325 a likelihood of the user interacting with the candidate video content item. The online system 140 may modify weights associated with characteristics of candidate video items over times based on interactions by the user with candidate video content items that are presented to the user to improve accuracy of the determination of the likelihood of the user interacting with candidate video content items. For example, if 90% of the user's previous interactions with video content items were with video content items provided to the online system 140 by additional users to which the user is connected, the online system 140 increases a weight applied to a characteristic of video content items indicating the video content items were provided to the online system 140 when determining 325 likelihoods of the user interacting with the video content items. The online system 140 may associate different models with different users and use a model associated with the user to determine 325 the likelihoods of the user interacting with the candidate content items to more accurately determine 325 the likelihoods.

In some embodiments, the online system 140 determines 325 likelihoods of the user interacting with each candidate video content item. Alternatively, the online system 140 determines 325 likelihoods of the user interacting with each of a subset of the candidate video content items. For example, the online system 140 identifies candidate video content items having one or more characteristics and determines 325 likelihoods of the user interacting with each of the identified candidate video content items. In some embodiments, the online system 140 identifies candidate video content items having greater than a threshold number of characteristics matching characteristics of the user or characteristics of the video content item with which the user interacted and determines 325 likelihoods of the user interacting with each of the identified candidate video content items.

Based at least in part on the likelihoods of the user interacting with the candidate video content items, the online system 140 selects 330 one or more candidate video content items. For example, the online system 140 ranks the candidate video content items based on their associated likelihoods of being interacted with by the user and selects 330 candidate video content items having at least a threshold position in the ranking. Alternatively, the online system 140 selects 330 candidate video content items having at least a threshold likelihood of being interacted with by the user. In some embodiments, the online system 140 selects 330 candidate video content items as well as other types of content items based on the likelihoods of the user interacting with the candidate video content items and based on the likelihoods of the user interacting with the other types of content items (e.g., content items including text data, content items including image data, etc.). Likelihoods of the user interacting with other types of content items are determined similarly to the likelihoods of the user interacting with the candidate video content items. For example, the online system 140 selects at least a threshold number of other types of content items as well as candidate video content items. For example, the online system 140 enforces a limitation restricting a number or percentage of non-video content items that are selected 330, so less than the number or percentage of non-video content items are selected 330. In some embodiments, the online system 140 separately selects 330 candidate video content items and other types of content items; alternatively, the online system 140 includes both candidate video content items and other types of content items in a single selection process.

The online system 140 generates 335 an interface including the selected candidate video content items. The generated interface may be configured to present the selected candidate video content items in a variety of formats in various embodiments. For example, the generated interface is a separate feed including the selected candidate video content items. Alternatively, the generated interface is a content presentation unit included in the feed presented to the user. The content presentation unit presents a single selected video candidate content item, but presents a different selected video candidate content item in response to certain user interactions with the content presentation unit. For example, if the feed presents content items in a vertical list and includes a content presentation unit, when certain interactions with the content presentation unit are received, the content presentation unit horizontally scrolls to present an alternative selected candidate content item. In some embodiments, the generated interface groups selected candidate video content items based on characteristics of the candidate video content items matching characteristics of the user or characteristics of the video content item with which the user interacted. For example, a group of selected candidate video content items in the generated interface includes selected candidate video content items having a characteristic matching a specific characteristic of the video content item with which the user interacted, while another group of selected candidate video content item includes selected candidate video content items having a characteristic matching a specific characteristic of the user. Examples of the generated interface are further described below in conjunction with FIGS. 4A-4C. The online system 140 presents 340 the generated interface to the user, allowing the user to view and interact with the selected candidate video content items. For example, the online system 140 communicates the generated interface to a client device 110 associated with the user for presentation.

Figure 4A:
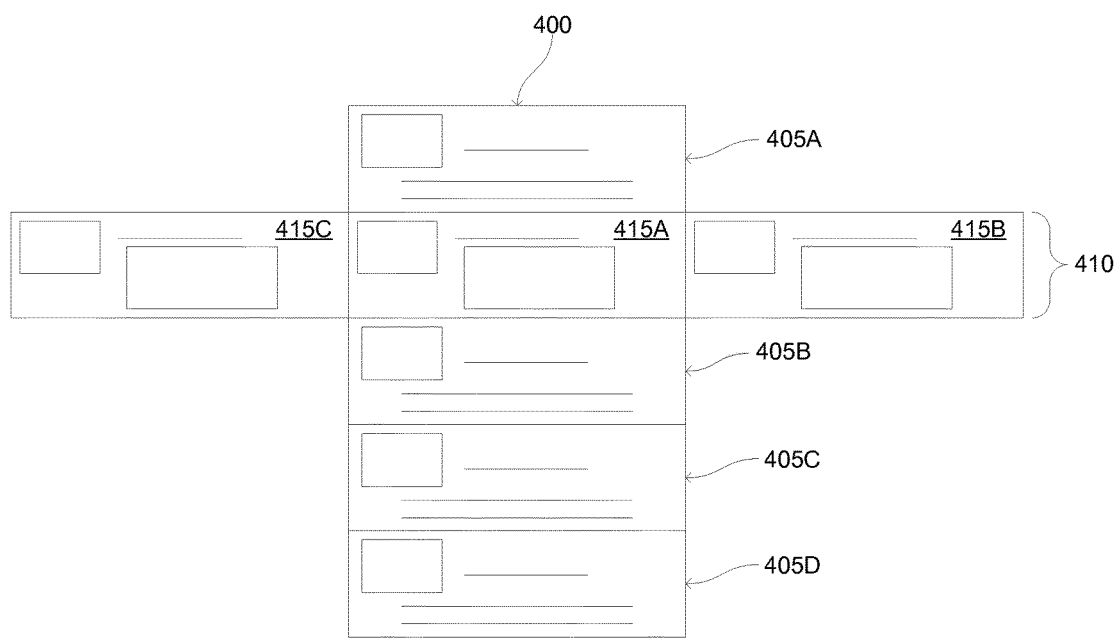
FIGS. 4A-4C are example interfaces presenting candidate video content items selected for presentation to an online system user, in accordance with an embodiment.

FIG. 4A is an example interface including candidate video content items selected by an online system 140 for presentation to a user. In the example of FIG. 4A, the online system 140 provides a feed 400 including content items 405A-405D that do not include video data and also includes less than a threshold number of video content items. When the user interacts with a video content item included in the feed 400, the online system 140 selects candidate video content items to present to the user and generates an interface including the selected candidate video content items, as described above in conjunction with FIG. 3. To present the selected candidate video content items without violating limitations on the number of video content items included in the feed, the online system 140 generates an interface that is a content presentation unit 410 including multiple selected candidate video content items 415A, 415B, 415C. The content presentation unit 410 may include content items other than selected candidate video content items 410 (e.g., content items including text or image data and not video data) in some embodiments. Additionally, information describing one or more reasons for inclusion of selected candidate video content items 415 in the content presentation unit 410 may be presented along with the selected candidate video content items 415 in the content presentation unit 410 (e.g., characteristics of a selected candidate video content item 415 matching a video content item with which the user interacted, characteristics of a selected video content item 415 matching characteristics of the user).

As shown in FIG. 4A, the content presentation unit 410 is presented in the feed 400 of content and presents a single selected candidate video content item 415A in the feed 400. However, when the user performs certain interactions with the content presentation unit 410, the content presentation unit 410 presents a different selected candidate video content item 415B, 415C in the feed 400, increasing the number of video content items the user may view in the feed 400 while maintaining one or more limitations on the number of video content items presented in the feed 400. For example, if the user performs one or more gestures with a region of a display device presenting the content presentation unit 410 (e.g., a gesture moving horizontally across the region of the display device) or interacts with a specific interface element in the content presentation unit 410 (e.g., a scroll bar or a navigation button), a different selected candidate video content item 415B, 415C is displayed in the feed 400 by the content presentation unit 410. Alternatively, the content presentation unit 410 presents a different selected candidate video content item 415B, 415C when the selected candidate video content item 415A presented in the feed 400 by the content presentation unit 410 completely plays. As another embodiment, the content presentation unit 410 changes presented information describing selected candidate video content items 415 at various time intervals and presents a selected candidate video content item 415 associated with information presented by the content presentation unit when an interaction with the content presentation unit 410 is received. In some embodiments, the content presentation unit 410 returns to the candidate video content item 415A initially presented in the content presentation unit 410 after presenting a threshold number of candidate video content items 415; alternatively, the content presentation unit returns to the candidate video content item 415A in response to receiving user interactions (e.g., interactions requesting navigation through candidate video content items 415 to the candidate video content item 415A that was initially presented).

Figure 4B:
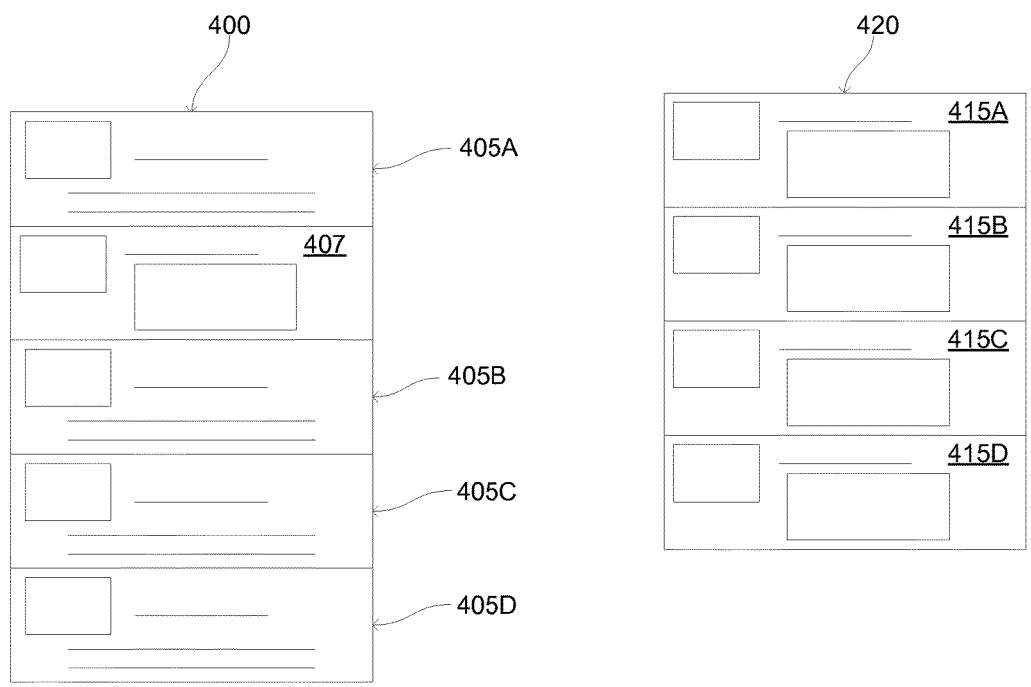

In the example of FIG. 4B, the online system 140 generates an interface that is an additional feed 420 including selected candidate video content items 415A-415D in response to receiving an interaction with the user by a video content item 407 included in the feed 400 along with other content items 405A-405D. The additional feed 420 may be presented to the user in addition to the feed 400 or in place of the feed 400 in various embodiments. In some embodiments, the additional feed 420 includes the selected candidate video content items as well as other types of content items (e.g., content items including text data or image data and not including video data). Additionally, the additional feed 420 may include information associated with various selected candidate video content items 415A-415D specifying one or more reasons for inclusion of the candidate video content items 415A-415D in the additional feed, as described above in conjunction with FIG. 4A.

Figure 4C:
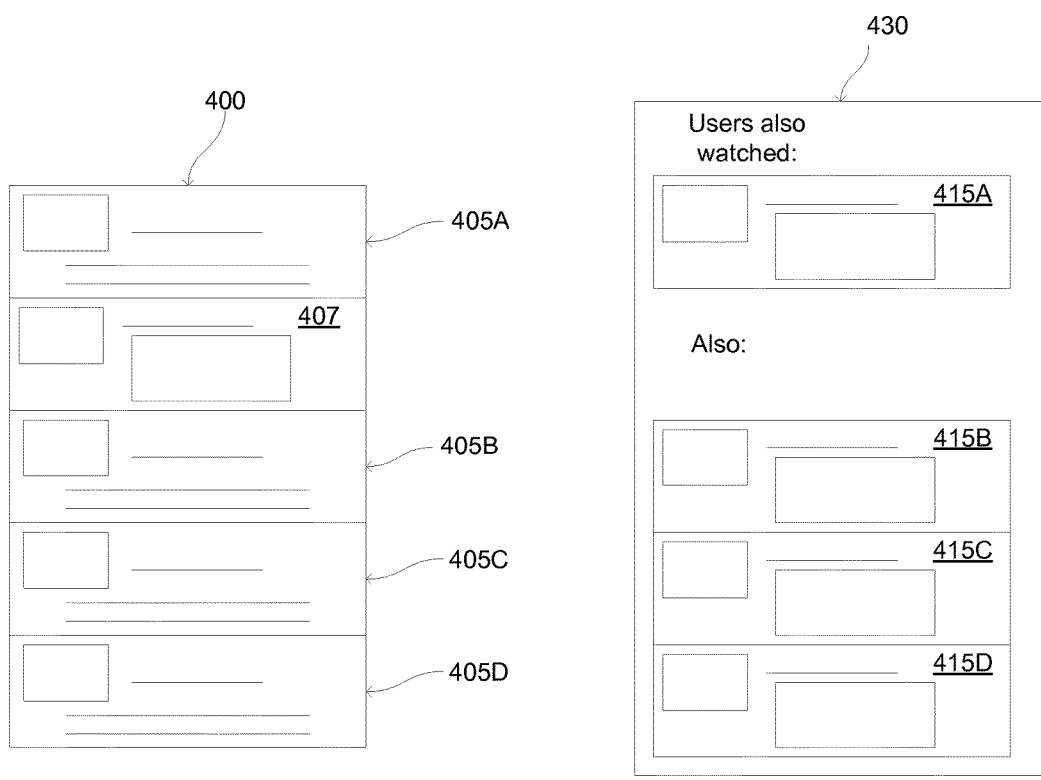

FIG. 4C shows another example of the interface where selected candidate video content items 415A-415D are presented in a channel 430 that plays the candidate video content items 415A-415D in a sequence. In the example of FIG. 4C, the channel 430 initially plays a selected candidate video content item 415A then plays selected video content items 415B-415D in series after candidate video content item 415A has completed playing. In some embodiments, the sequence in which the selected video content items 415A-415D are played is based at least in part on the likelihoods of the user interacting with various selected video content items 415A-415D, so selected candidate video content items 415A-415D with which the user is more likely to interact have earlier positions in the sequence. The channel 430 is presented to the user in response to the user interacting with a video content item 407 included in a feed 400 of content items 405A-405D presented to the user. In some embodiments, the channel 430 includes selected candidate video content items 415A-415D having a common characteristic (e.g., a specific characteristic matching a characteristic of the user or a characteristic of the video content item 407 included in the feed), and the online system 140 generates different channels 430 for different characteristics. As described above in conjunction with FIGS. 4A and 4B, additional information may be presented in the channel 430 in association with the selected candidate video content items 415A-415D.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
generating, a feed of diverse content items for a user of an online system that includes one or more video content items provided by additional users that are connected to the user within the online system, the feed of diverse content items generated by imposing a restriction that specifies a maximum number of video content items that can be included in the feed of diverse content items;
providing the generated feed of diverse content items to a client device for presentation to the user;
responsive to receiving information describing one or more interactions by the user with a video content item included in the feed of diverse content items, the one or more interactions suggesting that the user currently has an interest in additional video content items:
 determining that the user should be presented with additional video content items beyond the maximum number allowed by the restriction; and
 retrieving information describing a plurality of candidate video content items maintained by the online system, each candidate video content item having at least a threshold number of characteristics matching characteristics of the video content item;
determining a likelihood of the user interacting with each of the candidate video content items based at least in part on characteristics of the user and characteristics of the candidate video content item;
selecting one or more of the candidate video content items based at least in part on the determined likelihoods; and
presenting, in a new content presentation unit provided to the user in addition to the feed, one or more of the selected candidate video content items, the new content presentation unit able to scroll in a direction perpendicular to the feed of diverse content items to present the one or more selected candidate video content items beyond the maximum number allowed by the restriction.

2. The method of claim 1, wherein retrieving information describing a plurality of candidate video content items maintained by the online system comprises:
retrieving information describing one or more candidate video content items having at least the threshold number of characteristics matching characteristics of the video content item; and
retrieving information describing one or more candidate video content items having at least a threshold number of characteristics matching characteristics of the user.

3. The method of claim 2, wherein a characteristic of the user comprises measures of similarity between the user and one or more additional users of the online system.

4. The method of claim 3, wherein retrieving information describing one or more candidate video content items having at least a threshold number of characteristics matching characteristics of the user comprises:
retrieving information describing one or more candidate video content items associated with an additional user with whom the user has at least a threshold measure of similarity.

5. The method of claim 2, wherein a characteristic of the user is selected from a group consisting of: a geographic location associated with the user, an interest associated with the user, and any combination thereof.

6. The method of claim 1, wherein a characteristic of the video content item is selected from a group consisting of: a user who provided the video content item to the online system, text data included in the video content item, an association between the video content item and a candidate video content item, and any combination thereof.

7. The method of claim 1, wherein presenting the one or more of the selected candidate video content items in the new content presentation unit able to scroll in a direction perpendicular to the feed of diverse content items comprises:
displaying one or more additional selected candidate content items in response to a user interaction with the new content presentation unit.

8. The method of claim 1, wherein the restriction on the number of video content items included in the feed of diverse content items comprises a maximum number of video content items having one or more specified characteristics included in the feed of diverse content items.

9. The method of claim 1, wherein selecting one or more of the candidate video content items based at least in part on the determined likelihoods comprises:
ranking the candidate video content items based at least in part on the determined likelihoods; and
selecting candidate video content items having at least a threshold position in the ranking.

10. The method of claim 1, wherein selecting one or more of the candidate video content items based at least in part on the determined likelihoods comprises:
selecting one or more candidate video content items having at least a threshold determined likelihood of being interacted with by the user.

11. The method of claim 1, wherein determining likelihoods of the user interacting with each of the candidate video content items based at least in part on characteristics of the user and characteristics of the candidate video content items comprises:
associating weights with characteristics of a candidate video content item; and
determining a likelihood of the user interacting with the candidate video content item based at least in part on the weights, the characteristics of the candidate video content item, and the characteristics of the user.

12. The method of claim 1, wherein an interaction by the user with the video content item included in the feed of diverse content items is selected from a group consisting of: requesting to play video data included in the video content item included in the feed of diverse content items, unmuting video data in the video content item included in the feed of diverse content items, increasing a volume of video data in the video content item included in the feed of diverse content items to greater than a threshold level, requesting presentation of the video data in the video content item included in the feed of diverse content items a larger display area occupying at least a threshold amount of a display area of a client device, presenting at least a threshold percentage of video data in the video content item included in the feed of diverse content items, and any combination thereof.

13. A computer program product comprising a non-transitory computer-readable storage medium having instructions encoded thereon that, when executed by a processor, cause the processor to:
generate a feed of diverse content items for a user of an online system that includes one or more video content items provided by additional users that are connected to the user within the online system, the feed of diverse content items generated by imposing a restriction that specifies a maximum number of video content items that can be included in the feed of diverse content items;
provide the generated feed of diverse content items to a client device for presentation to the user;
responsive to receiving information describing one or more interactions by the user with a video content item included in the feed of diverse content items, the one or more interactions suggesting that the user currently has an interest in additional video content items:
determine that the user should be presented with additional video content items beyond the maximum number allowed by the restriction; and
retrieve information describing a plurality of candidate video content items maintained by the online system, each candidate video content item having at least a threshold number of characteristics matching characteristics of the video content item;
determine a likelihood of the user interacting with each of the candidate video content items based at least in part on characteristics of the user and characteristics of the candidate video content item;
select one or more of the candidate video content items based at least in part on the determined likelihoods; and
present, in a new content presentation unit provided to the user in addition to the feed, one or more of the selected candidate video content items, the new content presentation unit able to scroll in a direction perpendicular to the feed of diverse content items to present the one or more selected candidate video content items beyond the maximum number allowed by the restriction.

14. The computer program product of claim 13, wherein retrieve information describing a plurality of candidate video content items maintained by the online system comprises:
retrieve information describing one or more candidate video content items having at least the threshold number of characteristics matching characteristics of the video content item; and
retrieve information describing one or more candidate video content items having at least a threshold number of characteristics matching characteristics of the user.

15. The computer program product of claim 13, wherein the content presentation scrolls in a direction perpendicular to the feed of diverse content items to present the one or more selected candidate video content items in response to a user interaction with the new content presentation unit.

16. The computer program product of claim 13, wherein an interaction by the user with the video content item included in the feed of diverse content items is selected from a group consisting of: requesting to play video data included in the video content item included in the feed of diverse content items, unmuting video data in the video content item included in the feed of diverse content items, increasing a volume of video data in the video content item included in the feed of diverse content items to greater than a threshold level, requesting presentation of the video data in the video content item included in the feed of diverse content items a larger display area occupying at least a threshold amount of a display area of a client device, presenting at least a threshold percentage of video data in the video content item included in the feed of diverse content items, and any combination thereof.

* * * * *